United States Patent
Thomas et al.

(10) Patent No.: US 8,824,579 B2
(45) Date of Patent: Sep. 2, 2014

(54) CODEBOOK PERFORMANCE FOR NON-LINEAR ARRAYS

(75) Inventors: Timothy A. Thomas, Palatine, IL (US); Frederick Vook, Schaumburg, IL (US)

(73) Assignee: Nokia Siemens Networks Oy, Espoo (FI)

( * ) Notice: Subject to any disclaimer, the term of this patent is extended or adjusted under 35 U.S.C. 154(b) by 388 days.

(21) Appl. No.: 13/241,643

(22) Filed: Sep. 23, 2011

(65) Prior Publication Data

US 2013/0077705 A1    Mar. 28, 2013

(51) Int. Cl.
*H04K 1/10* (2006.01)
*H04L 27/28* (2006.01)
*H04B 7/04* (2006.01)

(52) U.S. Cl.
CPC ............ *H04B 7/0469* (2013.01); *H04B 7/0486* (2013.01)
USPC ........... 375/260; 375/346; 375/267; 375/296; 375/297; 375/299

(58) Field of Classification Search
USPC .......... 375/260, 346, 267, 295, 296, 297, 299
See application file for complete search history.

(56) References Cited

U.S. PATENT DOCUMENTS

| 8,284,849 B2 | 10/2012 | Lee et al. ........................ 375/260 |
| 2008/0013644 A1* | 1/2008 | Hugl et al. ...................... 375/295 |
| 2008/0192856 A1 | 8/2008 | Jongren et al. ................. 375/267 |
| 2010/0054200 A1* | 3/2010 | Tsai .............................. 370/329 |
| 2010/0260243 A1 | 10/2010 | Ihm et al. ....................... 375/219 |
| 2011/0085618 A1 | 4/2011 | Zhuang et al. ................. 375/296 |

FOREIGN PATENT DOCUMENTS

WO    WO-2012/15143 A1    11/2012
WO    WO-2012/151143 A1    11/2012

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0, Jun. 2011, 194 pgs.
Sleiman, A., et al.; "Antenna Array Manifold: A Simplified Representation"; 2000; pp. 3164-3167; IEEE; Department of Electrical & Electronic Engineering, Imperial College of Science, Technology and Medicine; London, UK.
Gupta, I., et al.; "An Experimental Study of Antenna Array Calibration"; Mar. 2003; pp. 664-667; IEEE Transactions on Antennas and Propagation; Department of Electrical Engineering, Ohio State University, ElectroSci. Lab.; Columbus, OH, USA.
V. Chandrasekhar, J. G. Andrews, A. Gatherer, "Femtocell Networks: a Survey," *IEEE Communications Mag.*, vol. 46, No. 9, pp. 59-67, 2008.
B. Mondal and T. A. Thomas, "Optimization of Two Layer Macro-Pico Network Using LTE," *submitted to Globecom 2011*, Houston, Texas, Dec. 2011. Email timothy.thomas@nsn.com for a copy. (5 pages).

(Continued)

*Primary Examiner* — Phuong Phu
(74) *Attorney, Agent, or Firm* — Harrington & Smith

(57) ABSTRACT

A method to improve codebook performance for non-linear arrays is described. The method includes determining a unitary matrix for a plurality of transmission antennas arranged in a given array type, the unitary matrix being determined based on a codebook, where the given array type is configured to steer beams in at least one of elevation and azimuth. The method also includes applying the determined unitary matrix to a signal to be transmitted across the plurality of transmission antennas. Apparatus and computer readable media are also described.

20 Claims, 11 Drawing Sheets

(56) References Cited

OTHER PUBLICATIONS

3GPP TS 36.211: Evolved Universal Terrestrial Radio Access (E-UTRA); Physical Channels and Modulation (Release 10), v10.0.0, Dec. 2010, (103 pages).

ITU-R M.2131-1, "Guidelines for Evaluation of Radio Interface Technologies for IMT-Advanced," Dec. 2009, (70 pages).

D. J. Love and R. W. Heath, "Limited Feedback Unitary Precoding for Spatial Multiplexing Systems," *IEEE Transactions on Information Theory*, vol. 51, Issue 8, Aug. 2005, (pp. 2967-2976).

* cited by examiner

| FIG.5A |
|---|
| FIG.5B |

CODEBOOK PERFORMANCE FOR NON-LINEAR ARRAYS

TECHNICAL FIELD

The exemplary and non-limiting embodiments of this invention relate generally to wireless communication systems, methods, devices and computer programs and, more specifically, relate to codebook performance for non-linear arrays.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
CB codebook
CDM code division multiplexing
DL downlink (eNB towards UE)
eNB E-UTRAN Node B (evolved Node B)
EPC evolved packet core
E-UTRAN evolved UTRAN (LTE)
FDD frequency division duplex
HARQ hybrid automatic repeat request
ITU International Telecommunication Union
LOS line of sight
LTE long term evolution of UTRAN (E-UTRAN)
MAC medium access control (layer 2, L2)
MIMO multiple input multiple output
MM/MME mobility management/mobility management entity
Node B base station
O&M operations and maintenance
OFDMA orthogonal frequency division multiple access
PDCP packet data convergence protocol
PHY physical (layer 1, L1)
RF radio frequency
RLC radio link control
RRC radio resource control
RRM radio resource management
SC-FDMA single carrier, frequency division multiple access
S-GW serving gateway
TDD time division duplex
Tx transmitter
UCA uniform circular array
UE user equipment, such as a mobile station or mobile terminal
UL uplink (UE towards eNB)
ULA uniform linear array
UMi urban microcell
UTRAN universal terrestrial radio access network
XP cross-polarized A communication system known as evolved UTRAN (E-UTRAN, also referred to as UTRAN-LTE or as E-UTRA) has been specified within 3GPP. The DL access technique is OFDMA, and the UL access technique is SC-FDMA.

One specification of interest is 3GPP TS 36.300, V10.4.0 (2011-06), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 10)", incorporated by reference herein in its entirety.

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
  functions for RRM: Radio Bearer Control, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the Serving Gateway;
  scheduling and transmission of paging messages (originated from the MME);
  scheduling and transmission of broadcast information (originated from the MME or O&M); and
  a measurement and measurement reporting configuration for mobility and scheduling.

In order to meet the growing data capacity needs of cellular communications, heterogeneous networks, which will contain a mixture of macro, pico and femto cells, will be deployed. Since the deployment conditions are different for these various cell types, the needs of the antenna array employed in each type of cell can vary as well. For example a macro cell will cover a much larger area than the pico or femto cells and hence will likely employ uniform linear arrays (ULAs) with a limited beamwidth in elevation since the macro cell will tend to be situated much higher than the pico or femto cells. In addition, the macro cell will likely be sectorized (e.g., three sectors) which makes the use of ULA a good match. Compared to the macro cell, the pico cell (it should be noted that the femto cell, which in most deployments will be inside a residence, has very similar requirements to the pico cell) will likely be closer to street-level (e.g., deployed on lamp posts), will need to serve much fewer UEs, will serve UEs with a much wider range of elevation angles and will need to be much lower cost than the macro cell. Hence for the pico cell a single sector deployment makes the most sense and hence an array type should be chosen with omni-directional antennas in mind. One example of a good array choice for a pico cell is the uniform circular array (UCA) which has as an added bonus over the ULA with the ability to steer a beam in elevation as well as azimuth.

Thus going forward many different array types will all need to operate within the limitations defined in the 3GPP LTE standard. For example, when defining codebooks (CBs) for use in closed-loop beamforming feedback procedures in 3GPP LTE, the CBs were optimized for the ULA. In particular the four antenna CB of R8 is optimized for a uniform linear array with co-polarized elements. The 8 antenna CB of R10 is optimized for a ULA consisting of cross-polarized (XP)

antennas (where each XP antenna contains two co-located antennas, one with a +45 polarization and the other with a −45 polarization). In particular the 8 antenna ULA of XP antennas can be thought of as two four-antenna ULAs, one made up of +45 polarized antennas and the other made of −45 polarized antennas and the CB design exploits this structure. Given the CB optimization toward the ULA, other array geometries will have a performance loss when using CB feedback in LTE unless there is a method to improve the performance while still being standards compliant.

In IEEE 802.16m an idea of improving the codebook performance to a UE was presented where the codebook is transformed by multiplying by a UE-specific covariance matrix which would improve the performance of non-linear arrays. The 802.16m idea is hence UE-specific and requires feedback from the UE (i.e., it is not a transparent operation). Implementing this method in an LTE system would also require a significant change to the LTE standard.

In UMB (3GPP2) a mode was present that allows the eNodeB to feed forward a codebook to the UEs. In this way the eNodeB and UEs could use a codebook that is optimized for the specific array type at the eNodeB. This method is not transparent to the UE and would require a significant change to the LTE standard to be used in LTE systems.

What is needed is a UE-transparent (and hence standards compliant) method for improving the CB feedback performance for non-ULAs is given with emphasis on the UCA.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method to improve codebook performance for non-linear arrays. The method includes determining a unitary matrix for a plurality of transmission antennas arranged in a given array type, the unitary matrix being determined based on a codebook, where the given array type is configured to steer beams in at least one of elevation and azimuth. The method also includes applying the determined unitary matrix to a signal to be transmitted across the plurality of transmission antennas.

In a further aspect thereof an exemplary embodiment of this invention provides an apparatus to improve codebook performance for non-linear arrays. The apparatus includes one or more processors; and one or more memories storing computer program code. The one or more memories and the computer program code configured to, with the one or more processors, cause the apparatus to perform at least the following: to determine a unitary matrix for a plurality of transmission antennas arranged in a given array type, the unitary matrix being determined based on a codebook, where the given array type is configured to steer beams in elevation and/or azimuth; and to apply the determined unitary matrix to a signal to be transmitted across the plurality of transmission antennas.

In an additional aspect thereof an exemplary embodiment of this invention provides a computer readable medium to improve codebook performance for non-linear arrays. The computer readable medium is tangibly encoded with a computer program executable by a processor to perform actions. The actions include determining a unitary matrix for a plurality of transmission antennas arranged in a given array type, the unitary matrix being determined based on a codebook, where the given array type is configured to steer beams in elevation and/or azimuth; and applying the determined unitary matrix to a signal to be transmitted across the plurality of transmission antennas.

In a further aspect thereof an exemplary embodiment of this invention provides an apparatus to improve codebook performance for non-linear arrays. The apparatus includes means for determining a unitary matrix for a plurality of transmission antennas arranged in a given array type, the unitary matrix being determined based on a codebook, where the given array type is configured to steer beams in elevation and/or azimuth; and means for applying the determined unitary matrix to a signal to be transmitted across the plurality of transmission antennas.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

In LTE a four antenna codebook was designed primarily with a uniform linear array (ULA) in mind. The consequence is that when using an array at the eNodeB other than a ULA (for example, a uniform circular array (UCA)) the performance with codebook feedback will be degraded relative to a codebook optimized for that array structure unless certain procedures are followed. Various exemplary embodiments in accordance with this invention provide methods for improving the performance of codebook feedback for arbitrary arrays. Various methods may have no impact on how the UE operates (i.e., the methods are transparent to the UE) and hence have no impact on the standard. Using these methods improvements of up to 1.1 dB are obtained when using a UCA with a four antenna LTE codebook.

Various exemplary embodiments in accordance with this invention provide a method for improving the performance of a given array type when using codebooks designed for a different array type, for example, the performance of non-linear arrays when using codebooks designed for linear arrays (e.g., LTE codebooks). A unitary matrix may be used which can be either pre-computed or computed in real time that when used is transparent to the UE. Various exemplary embodiments may include feeding forward (from the eNodeB to the UE) or feeding back (from the UE to the eNodeB) a unitary matrix which improves the link-level performance of an existing codebook (e.g., an LTE four antenna codebook).

Figure 2:
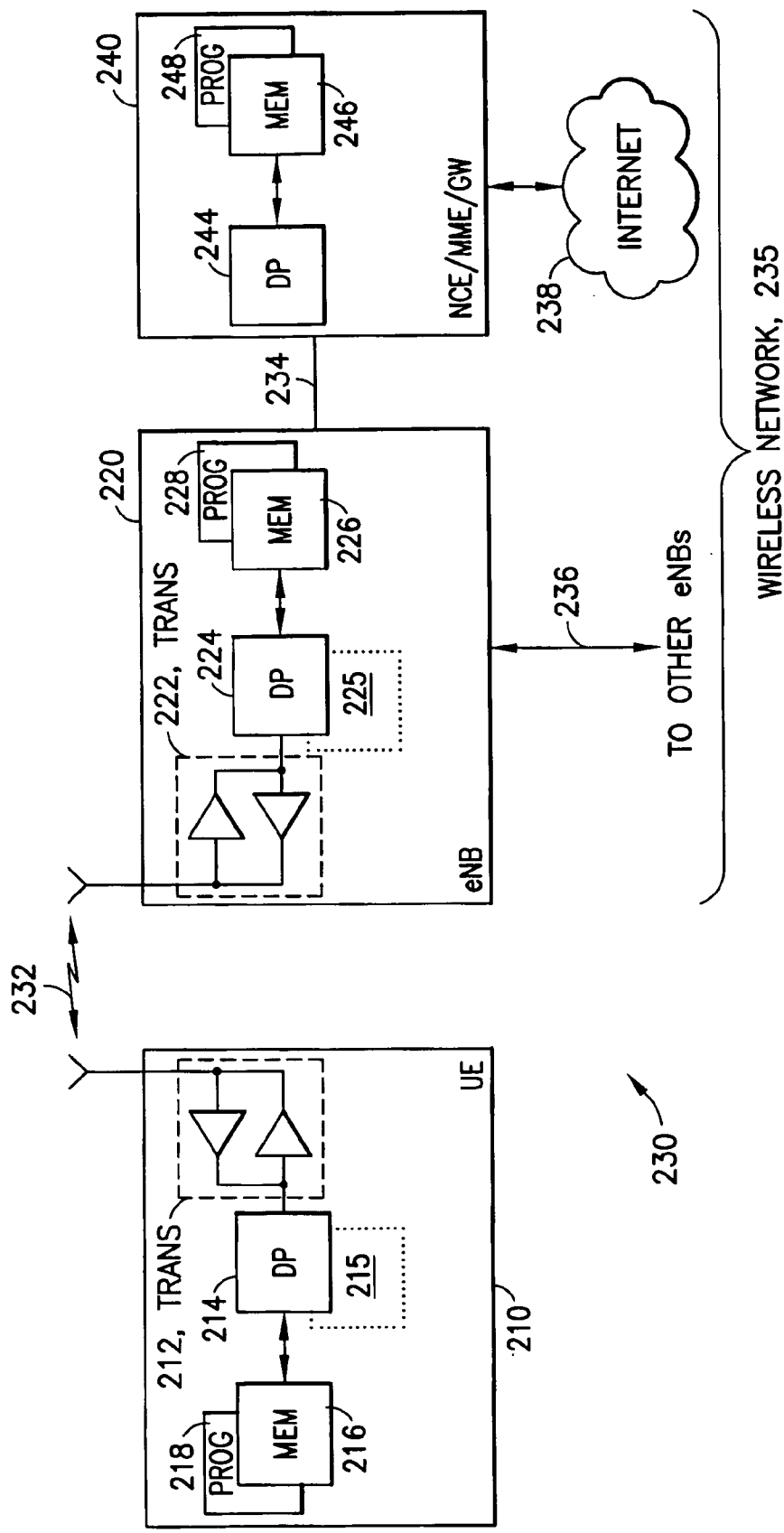
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

Figure 1:
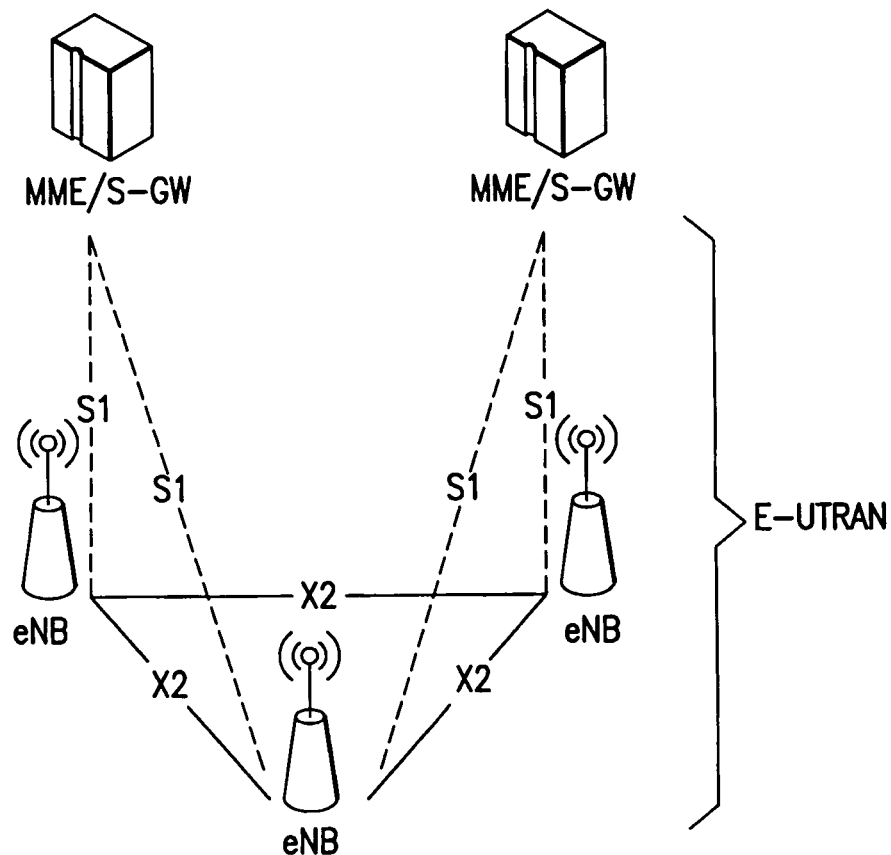
FIG. 1 reproduces FIG. 4-1 of 3GPP TS 36.300, and shows the overall architecture of the E UTRAN system.

In the wireless system 230 of FIG. 2, a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include the MME/SGW functionality shown in FIG. 1, and which provides connectivity with a network, such as a telephone network and/or a data communications network (e.g., the internet 238).

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 214 of the UE 210; by the DP 224 of the eNB 220; and/or by the DP 244 of the NCE 240, or by hardware, or by a combination of software and hardware (and firmware).

The UE 210 and the eNB 220 may also include dedicated processors, for example, codebook processor 215 and codebook processor 225.

In general, the various embodiments of the UE 210 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 3:
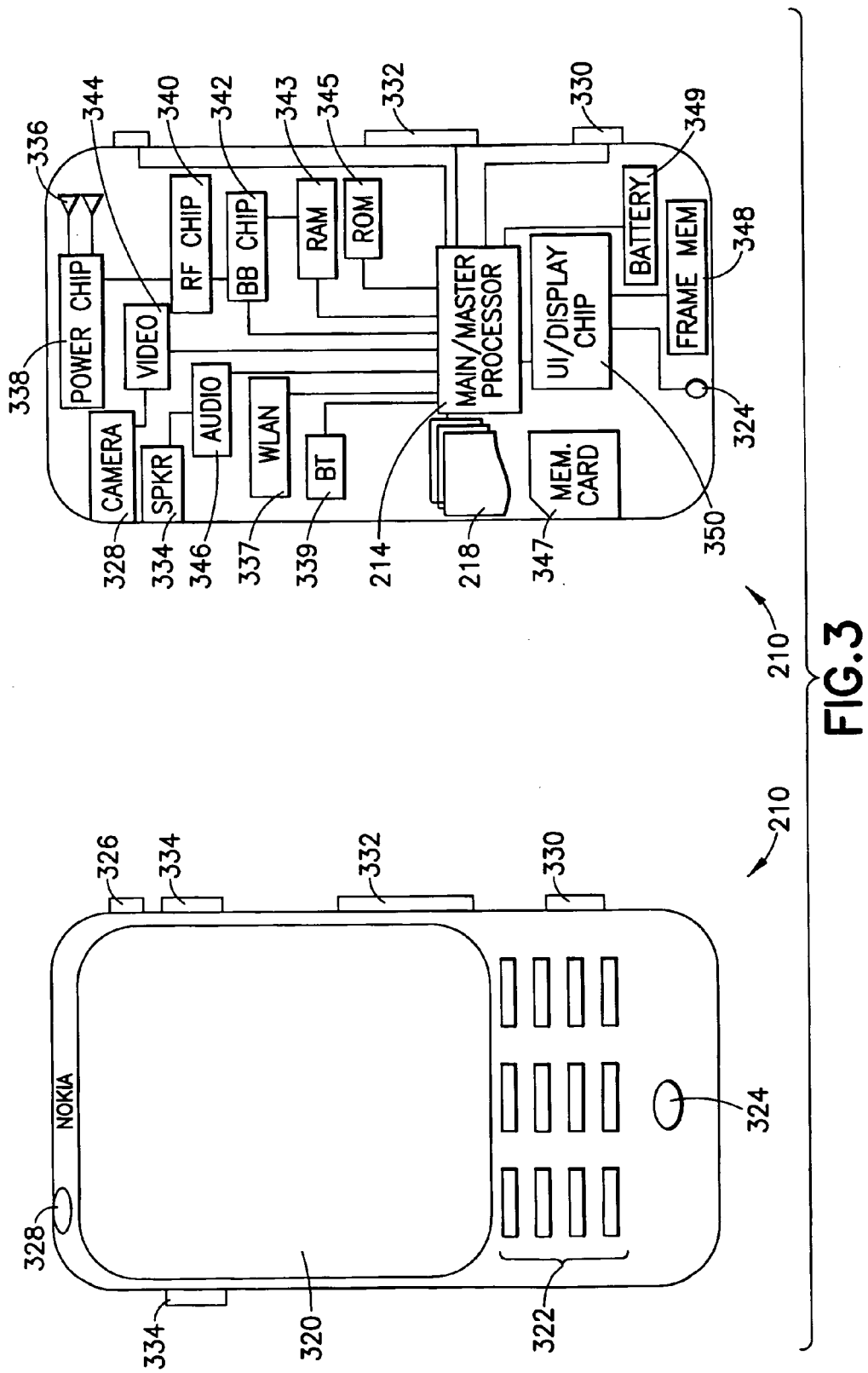
FIG. 3 shows a more particularized block diagram of an exemplary user equipment such as that shown at FIG. 2.

FIG. 3 illustrates further detail of an exemplary UE in both plan view (left) and sectional view (right), and the invention may be embodied in one or some combination of those more function-specific components. At FIG. 3 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multi-band for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB)

chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

Processors 338, 340, 342, 344, 346, 350, if embodied as separate entities in a UE 210 or eNB 220, may operate in a slave relationship to the main processor 214, 224, which may then be in a master relationship to them. Embodiments of this invention may be most relevant to the DP 224 and codebook processor 225, though it is noted that other embodiments need not be disposed there but may be disposed across various chips and memories as shown or disposed within another processor that combines some of the functions described above for FIG. 3. Any or all of these various processors of FIG. 3 access one or more of the various memories, which may be on-chip with the processor or separate therefrom. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown at FIG. 3.

Note that the various chips (e.g., 338, 340, 342, etc.) that were described above may be combined into a fewer number than described and, in a most compact case, may all be embodied physically within a single chip.

Now a detailed description of an exemplary embodiment of the invention will be given assuming a CB which was designed for a ULA. Although a ULA is used as an example, the same methodology can be applied to improve the performance of any arbitrary array type (e.g., antenna elements placed at any x, y or z location) when using a codebook designed for a different array type.

The CBs in LTE were designed for arrays with M×1 manifold vectors of the type:

$$M \times 1 a(\theta) = \begin{bmatrix} 1 \\ e^{-j2\pi d \sin(\theta)} \\ \vdots \\ e^{-j2\pi d(M-1)\sin(\theta)} \end{bmatrix}, \quad (1)$$

where M is the number of antennas in the array, d is the inter-element spacing in wavelengths and θ is the angle of incidence of the departing plane wave (assuming downlink transmission). A manifold vector captures the phase response on each antenna in the array for an arriving (or departing) plane wave at some incidence (or departure) angle. Note that it is assumed the ULA is aligned in the x-y plane and because of the particular geometry of the ULA, the phase response is the same for any elevation angle (and hence the manifold vector is only a function of azimuth angle). In contrast the array manifold vector for a uniform circular array (UCA) with M elements and radius, r (in wavelengths), is given as:

$$M \times 1\, a(\theta, \phi) = \begin{bmatrix} e^{j2\pi r \sin(\phi)\cos(\theta)} \\ e^{j2\pi r \sin(\phi)\cos(\theta - 2\pi/M)} \\ \vdots \\ e^{j2\pi r \sin(\phi)\cos(\theta - 2\pi(M-1)/M)} \end{bmatrix}, \quad (2)$$

where $\phi$ is the elevation angle ($0 \le \phi \le 180$) with $\phi=90$ being in the x-y plane.

Hence without any analysis, intuition indicates there could be a significant performance loss for the UCA relative to a ULA when using a CB designed for a ULA (this type of CB is also known as a uniform linear array CB) just based on mismatch between the array manifold vectors. To quantify the loss for a rank-1 CB of B vectors ($f_1, \ldots, f_B$), the following metric can be plotted (for the UCA or other 2-D arrays, $\phi$ is set to 90 degrees or to the expected elevation angle of the UEs):

$$g(\theta) \overset{\max}{\underset{m}{}} |f_m^T a(\theta)|^2. \quad (3)$$

Figure 4:
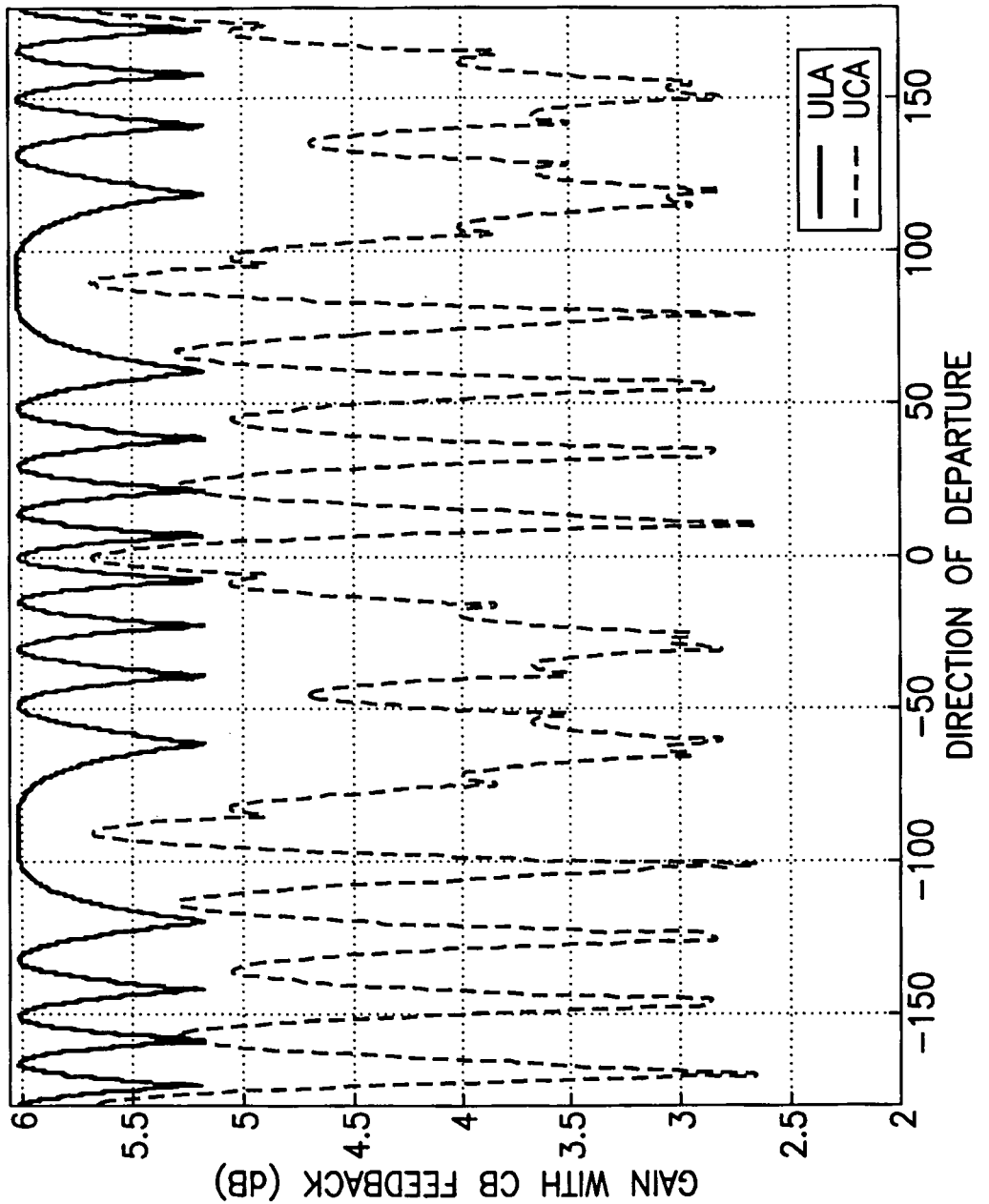
FIG. 4 illustrates a gain of CB feedback at given direction angle when selecting the optimal CB precoder for each angle.

FIG. 4 plots this metric using the R8 LTE CB for various departure angles for both a ULA with d=0.5λ inter-element spacing and a UCA with a r=0.94λ radius with both arrays having M=4 antennas. As can be seen, at some angles the UCA has over a 3.0 dB loss over the ULA. Also the ULA has very little deviation (less than around 0.8 dB) from the max gain of 6.02 dB whereas the UCA has a very wide deviation (up to about 3.0 dB). The goal will be to find a unitary transform that can be applied to the signals transmitted from the eNodeB employing a UCA such that the deviation is minimized and the mean gain is close to what the ULA obtains.

Unitary Matrix for Improving CB Feedback

For any rank (where rank means the number of data streams which will be transmitted to the UE), the basic design philosophy is to create a unitary matrix, T, that is applied to the signal across transmit antennas at the eNodeB which improves the performance of a given CB (e.g., the LTE CB). The unitary matrix may be applied all of the time by the eNodeB (i.e., for the common reference symbols, control channels, shared channels and dedicated pilots if present). In equation form the transmitted signal is given as:

$$M \times 1 z(t) = T^T x(t), \quad (4)$$

where $T^H T = I$ (i.e., this is the unitary condition) and x(t) is the original M×1 transmit signal on all antennas at time t (note the transform can be applied in the frequency domain or the time domain and a transpose of T is used to simplify the following expressions for deriving T).

For rank 1 CB feedback where precoding vector $f_l$ is selected, $x(t)=f_l s(t)$ where s(t) is the transmitted symbol at time t. Since the transmitted signal is $T^T x(t)$ some care should be exercised in the design of T so that $T^T f_l$ is equal gain on each transmit branch if desired for codebook transmissions. If that product is not equal gain on each transmit antenna then some care should be taken in scheduling multiple users across frequency so that the power on the transmit branches is roughly equal.

For the methods described it is assumed that the arrays are manifold (aka baseband) calibrated where manifold calibration means that the effects of the gains and phases of the transceiver hardware are removed so that the baseband channel matches the RF channel. The method for determining the unitary matrix could be applied to arrays that are either manifold calibrated or reciprocity calibrated for TDD (reciprocity calibration for TDD means that a channel measured on the uplink can be used to beamform on the downlink).

Rank 1 Design (Matching to CB)

One method for determining T for a given rank-1 CB (note that the CB could be designed for any array type and is not limited to just the ULA) is to find T that maximizes the following:

$$\sum_{\theta \in \Omega} \max_m |f_m^T T a(\theta)|^2, \quad (5)$$

where $\Omega$ is the set of angles of interest (e.g., from −180 to +180 with some increment) and for the UCA $\phi$ is set to 90 degrees. Note that if elevation angles are important for the given deployment, (5) can be modified to include averaging over elevation angles along with azimuth angles. Finding a closed-form solution is very difficult (if not impossible) since the best CB vector is a function of T. Hence a couple of different gradient approaches are proposed (note that computational complexity is not an issue since T is precomputed and stored in a memory unit at the eNodeB).

Note that the array manifold in Eq. (5) could be replaced with one that accounts for mutual coupling (as is known in the art) in the array (e.g., by replacing $a(\theta)$ by $Ca(\theta)$ where $C$ is a coupling matrix) or even could be replaced with measured manifold vectors for the specific array.

In the following descriptions, only the azimuth angle is considered, but generalization to elevation angle is straightforward (e.g., by adding elevation angle to the manifold vectors, $a(\theta)$, and summing over a set of azimuth and elevation angles).

Rank 1 Design Maximizing the Mean Gain

For designing T which maximizes the mean gain, the gradient is given as:

$$\Delta_T = \frac{1}{|\Omega|} \sum_{\theta \in \Omega} f_{l_\theta}^* f_{l_\theta}^T T a(\theta) a^H(\theta), \quad (6)$$

where $|\Omega|$ is the number of elements in $\Omega$ and $l_\theta$ is the CB index which maximizes:

$$|f_l^T T a(\theta)|^2. \quad (7)$$

Rank 1 Design Maximizing the Minimum Gain

The idea is to start with some arbitrary unitary T and then find the angle, $\theta$ denoted as $\theta_{min}$, that minimizes:

$$\theta_{min} = \arg\min\left(\max_m |f_m^T T a(\theta)|^2\right). \quad (8)$$

To find $\theta_{min}$, $\theta$ can be scanned over the finite set of angles, $\Omega$. Then using $\theta_{min}$, the gradient of T can be found as:

$$\Delta_T = f_l^* f_l^T T a(\theta_{min}) a^H(\theta_{min}), \quad (9)$$

where $l$ is the best CB index for $\theta_{min}$.

Gradient Search for Either Criteria

Using either gradient discussed above, the procedure for determining T is given as:

1. Start with an arbitrary unitary T.
2. Determine $\Delta_T$ using Eqs. (6) or (9).
3. Update T using $T_{new} = T_{old} + \alpha \Delta_T$ where $\alpha$ is the gradient step size (e.g., $\alpha = 0.1$).
4. Enforce the unitary criteria (e.g., by applying the Gram-Schmidt orthogonalization procedure on the updated T or by forcing the singular values of T to be one or if a phase-only sparse matrix is desired, only keep the phase of one element in each row).
5. Determine the worst-case metric (i.e., minimize over $\theta$) or mean metric using Eq. (3) and if T has an improved worst-case or mean metric, then set $T_{best} = T$.
6. If the maximum number of iterations is not reached, go to step 2, otherwise $T_{best}$ is the solution.

When implementing the gradient search using a Gram-Schmidt procedure it was found that it is best to choose a different column order for the Gram-Schmidt algorithm at each iteration of the gradient procedure.

It should be noted that the optimization problem of Eq. (5) has many local maxima so the gradient procedure will not converge to the global maxima in general. Thus to determine the best T many runs of the procedure should be done with different random unitary matrix starting points and the final T with the best metric is kept. Also the step size, $\alpha$, should be decreased as T converges to a local maxima (e.g., start with $\alpha = 0.1$ and decrease from there, e.g., to 0.01 then to 0.001).

After some experimentation with the UCA (alternating between using the gradient for the mean gain and the gradient for the minimum gain), it appears that one of the better solutions for T is a sparse matrix where each row only has one non-zero entry. As an example, one of the better unitary matrices found for a UCA with r=0.94 when using the LTE R8 four antenna CB is one of the following:

$$T_1 = \begin{bmatrix} 0 & 0 & 0 & e^{j2.3655} \\ 1 & 0 & 0 & 0 \\ 0 & 0 & e^{-j2.3655} & 0 \\ 0 & j & 0 & 0 \end{bmatrix} \quad (10)$$

$$\approx \begin{bmatrix} 0 & 0 & 0 & e^{j3\pi/4} \\ 1 & 0 & 0 & 0 \\ 0 & 0 & e^{-j3\pi/4} & 0 \\ 0 & j & 0 & 0 \end{bmatrix},$$

$$T_2 = \begin{bmatrix} 0 & 0 & -1 & 0 \\ 0 & 0 & 0 & 1 \\ -j & 0 & 0 & 0 \\ 0 & j & 0 & 0 \end{bmatrix}. \quad (11)$$

Figures 5, 5A:
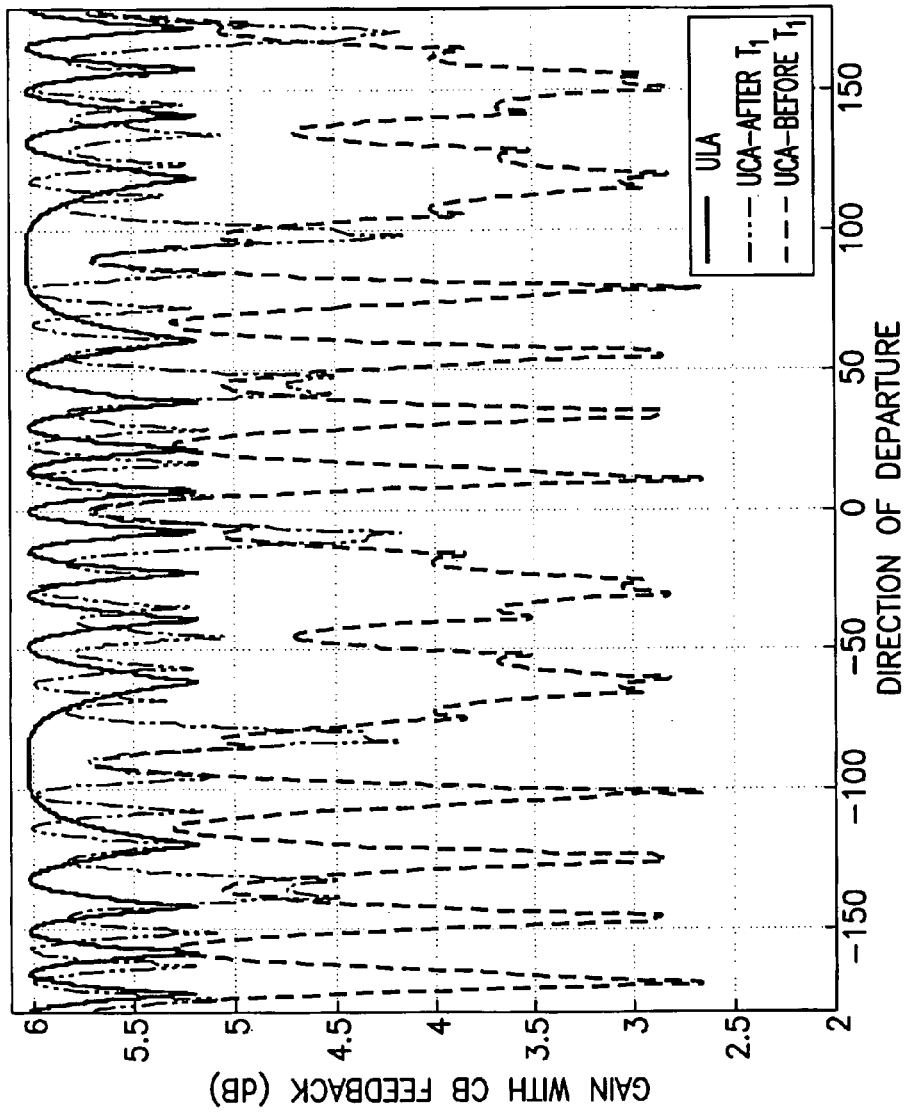
FIG. 5 illustrates a gain of CB feedback at given direction angle when selecting the optimal CB precoder for each angle for a ULA and a UCA before and after the unitary transform is applied.
Figure 5B:
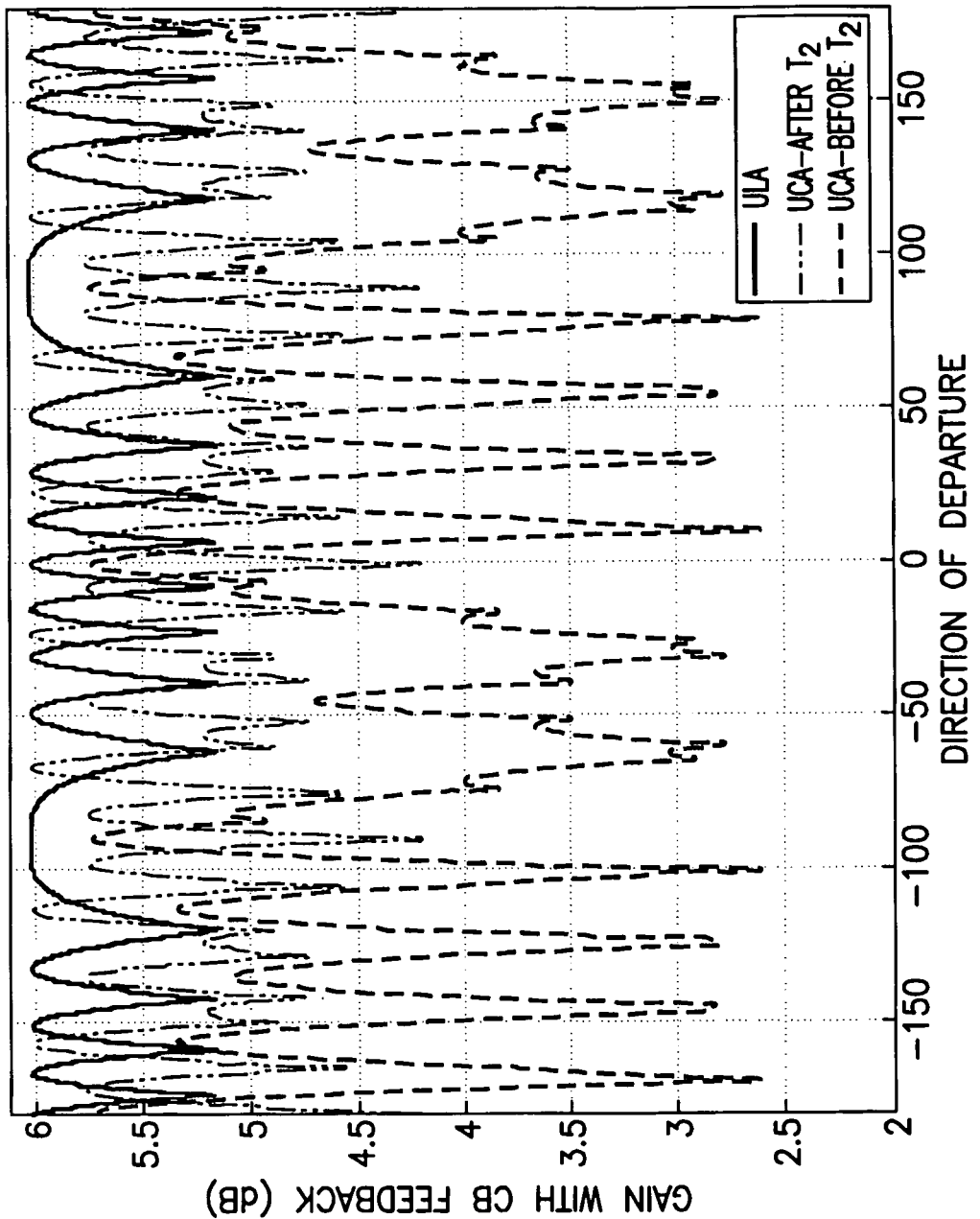

FIG. 5 shows the gain metric of Eq. (3) before and after applying $T_1$ and $T_2$ for the four antenna UCA with r=0.94 with the LTE R8 CB. As can be seen the performance has been significantly improved after using either T both in terms of deviation from maximum gain and in loss over the ULA performance.

Figure 6:
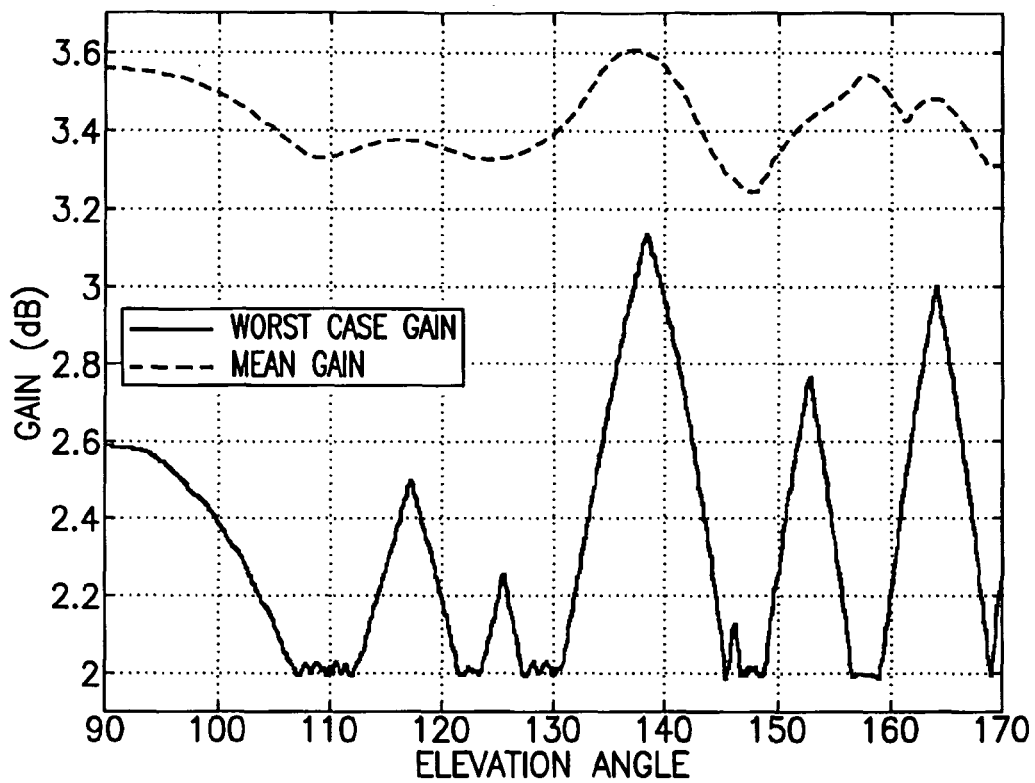
FIG. 6 illustrates a mean gain and worst-case gain (i.e., at the azimuth angle with the lowest gain) of CB feedback for various elevation angles for the T in (10) with a radius of 0.94λ.
Figure 7:
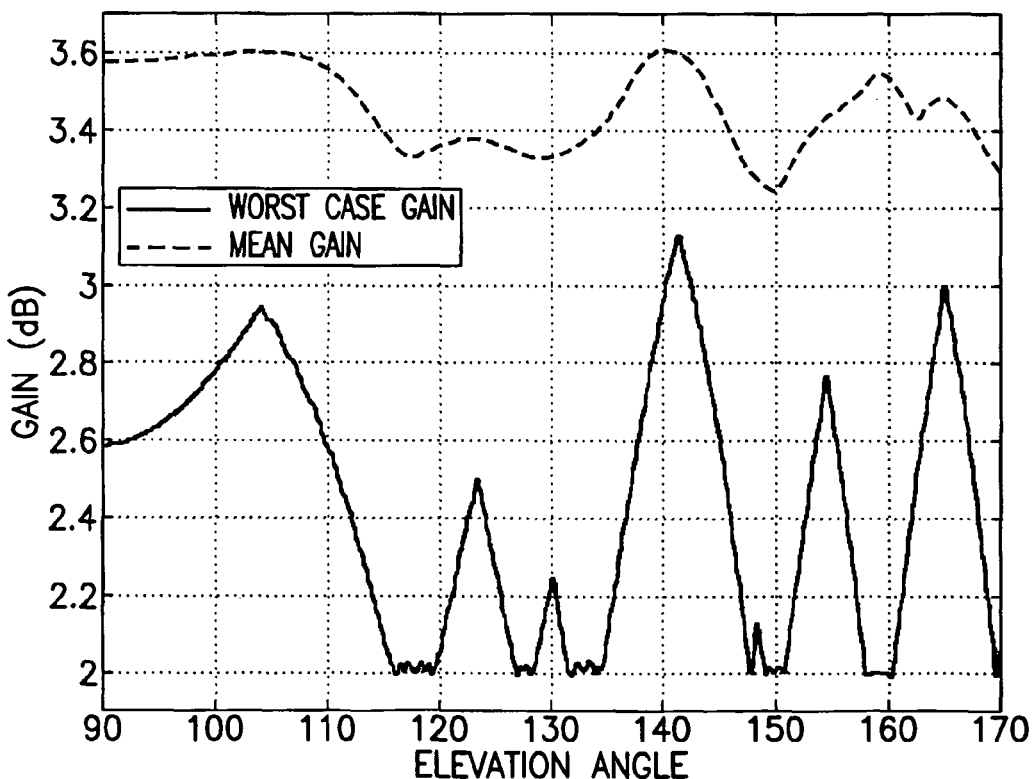
FIG. 7 illustrates a mean gain and worst-case gain (i.e., at the azimuth angle with the lowest gain) of CB feedback for various elevation angles for the T in (10) with a radius of 1.0λ.

There might be some question as to how robust T is to elevation angle since 90 degrees was used as the elevation angle when determining these two Ts and also for the plots in FIG. 5. FIG. 6 shows the mean gain and the gain for the worst case azimuth angle for various elevation angles using $T_1$ (note that it is assumed that the eNodeB is higher than the UE). For expected elevation angles (within 20 degrees of plane of the UCA) the mean and the worst case gain using $T_1$ from Eq. (10) degrades very rapidly. In fact once elevation angle is considered it might be better to use $T_1$ with a radius of $1.0\lambda$ which is shown in FIG. 7. In this case the mean and worst-case gain have much better performance than the $0.94\lambda$ case over the 20 degree range from the plane of the UCA. Thus, it may be important in some deployments to optimize T for azimuth and elevation angles as mentioned above.

Rank 1 Design (Matching to ULA Array Manifold Vectors)

Another alternative to the above rank-1 design is to find a unitary transform that tries to map the UCA manifold vectors to the ULA manifold vectors. One way to accomplish this design is simply to replace the CB of Eqs. (5)-(9) with samples of the ULA manifold at angles of interest. Another option is to find a T that minimizes:

$$\sum_{\theta \in \Omega} |Ta_{UCA}(\theta, 90) - a_{ULA}(\theta)|^2. \quad (12)$$

It appears that T's found with either of these methods will have decent performance but may not be quite as good as ones that are matched to the exact CB being used. However using one of these approaches may make sense if the array might be used with multiple CBs (e.g., if the CB changes at some future point).

Rank>1 Design

Given the nature of the LTE R8 CB (i.e., the nested structure), the T found with Eq. (5) is likely still good for ranks 2 and higher as well. However, the criteria could be altered for higher ranks using a capacity-centric formula such as:

$$\sum_{\theta \in \Omega} \max_m \log_2\left( \det\left( I_{N_S} + \frac{1}{N_S \sigma^2} F_m^H H^H H F_m \right) \right), \quad (13)$$

where $N_S$ is the number of streams to be transmitted (i.e., rank), H is a $M_R \times M$ matrix of channel coefficients, $M_R$ is the number of receive antennas, $\sigma^2$ is the noise power and $F_m$ is the $m^{th}$ M×N, CB matrix.

Note that the above gradient procedure can be used, but the gradient of the capacity may be difficult to compute (but a gradient approximation could be used). Also some assumption needs to be made about the channel (e.g., a certain channel like the ITU-UMi line-of-sight channel) since a channel matrix is needed instead of just array manifold vectors.

Another option when designing T for rank>1 is to use the rank 1 design procedure but using vector CB entries which span all columns of the rank>1 matrices.

Some issues to consider when optimizing for rank 2 and above:

1. Since rank 1 and rank>1 users will be mixed within a subframe and common reference symbols have to be altered with the same T across a subframe (for channel estimation purposes), only one T can be used for all ranks. Even changing T in time (e.g., changing it on different subframes) can be problematic for feedback (as the UE measures the common reference symbols using the same T it will have its data sent on).

2. Rank 1 might be the more important case to optimize over anyway because edge-cell users (which benefit the most from beamforming gain) will likely be rank 1.

Unitary Matrix Design Using Uplink Sounding

In this method for determining the unitary matrix the uplink signal (e.g., the uplink sounding signal) is used and hence the actual channel conditions are factored into the design of the matrix. (Note that the UE can also calculate the unitary matrix using a downlink signal in a fashion similar to the eNodeB using the uplink signal with the only caveat being that the method is transparent to the eNodeB rather than to the UE.) In FDD the uplink and downlink arrays may be manifold calibrated, but for TDD the arrays may be reciprocity calibrated.

Assume that a M×M covariance matrix, $R_u$, is estimated from uplink sounding (or some other uplink signal) for user u and there are $N_u$ total users. Let $e_u$ be the dominant eigenvector of $R_u$ where dominant eigenvector means the eigenvector associated with the largest eigenvalue of $R_u$. Although the method assumes only a single dominant eigenvector, the method can easily be extended to include multiple dominant eigenvectors. Then a method for determining T with uplink sounding is to find the T that maximizes the following:

$$\sum_{u=1}^{N_u} \min_m |f_m^T Te_u|^2. \quad (14)$$

A similar gradient search to the rank-1 methods can be used and also the same criteria (maximize the mean gain and maximize the minimum gain) can be used. The gradient for the mean gain is given as:

$$\Delta_T = \frac{1}{N_u} \sum_{u=1}^{N_u} f_{\ell_u}^* f_{\ell_u}^T Te_u e_u^H, \quad (15)$$

where $l_u$ is the CB index which maximizes:

$$|f_l^T Te_u|^2. \quad (16)$$

For the maximize the minimum gain criteria the gradient is given as:

$$\Delta_T = f_l^* f_l^T Te_{u_{min}} e_{u_{min}}^H, \quad (17)$$

where l is the best CB index for $e_u$ (i.e., the index that maximizes $|f_l^T Te_u|^2$).

Note that unlike the methods above, the method using uplink sounding may compute T in real-time operation. However, the update of T would likely be very slow (e.g., on the order of hours).

An advantage of calculating T in real time is that it would include any implementation specific imperfections in the array like mismatch in antenna spacing, non-ideal antenna patterns of the individual elements, and also mutual coupling.

Feeding Forward Unitary Matrix to UE

No matter how the unitary matrix, T, is calculated another option for its use is for the eNodeB to feed it forward to the UEs. In that way the UE can transform the base codebook and then use the transformed codebook for feedback. Also then the eNodeB does not need to apply the unitary matrix to open-loop transmission, broadcast information, and common reference symbols. For startup operations before T is known at the UE, the UE can assume that T is the identity matrix. The following options are possible:

1. The eNodeB calculates one T (or has a pre-computed T) for all mobiles and feeds forward T on a very slow time scale.
2. The eNodeB calculates a T for each UE (or for small groups of UEs say based on their locations) and then feeds forward the unique T to each UE. Again the feed-forward operation could be done on a relatively infrequent time scale.
3. The eNodeB could have a set of choices for T (e.g., one for a ULA with a co-polarized antennas, one for a ULA with antennas with mixed polarizations, one for a UCA with co-polarized elements, and one for a UCA with antennas with mixed polarizations) and then could feed forward a number indicating which choice of T for the UEs to use.

Feedback of Unitary Matrix

As an alternative to the eNodeB calculating the unitary matrix, the UE could calculate the best unitary matrix for it and then feed it back to the eNodeB for use in codebook transmission. The UE could determine the unitary matrix from downlink reference symbol transmissions using a similar procedure to the one for uplink sounding used by the eNodeB. As an alternative to calculating the unitary matrix, the UE could select one from a set of pre-determined unitary matrices (e.g., one for a ULA with a co-polarized antennas, one for a ULA with antennas with mixed polarizations, one for a UCA with co-polarized elements, and one for a UCA with antennas with mixed polarizations) and then it could feedback a number indicating which unitary matrix is the best for the eNodeB to use.

Simulation Results

Simulation results are presented for rank-1 CB feedback using the four Tx LTE CB. The ITU UMi channel (both line of sight (LOS) and non-LOS) is simulated and delay-free wideband feedback (10 MHz) is assumed (10,000 channel realization are simulated). Two arrays are compared at the eNodeB, one is a ULA with a 0.5λ spacing and the other is a UCA with a radius of 0.94λ. The UE has two antennas which are co-located cross-polarized antennas with a random orientation. An FDD system is assumed and the unitary matrix of Eq. (10) is used to improve the CB performance of the UCA.

Figure 8:
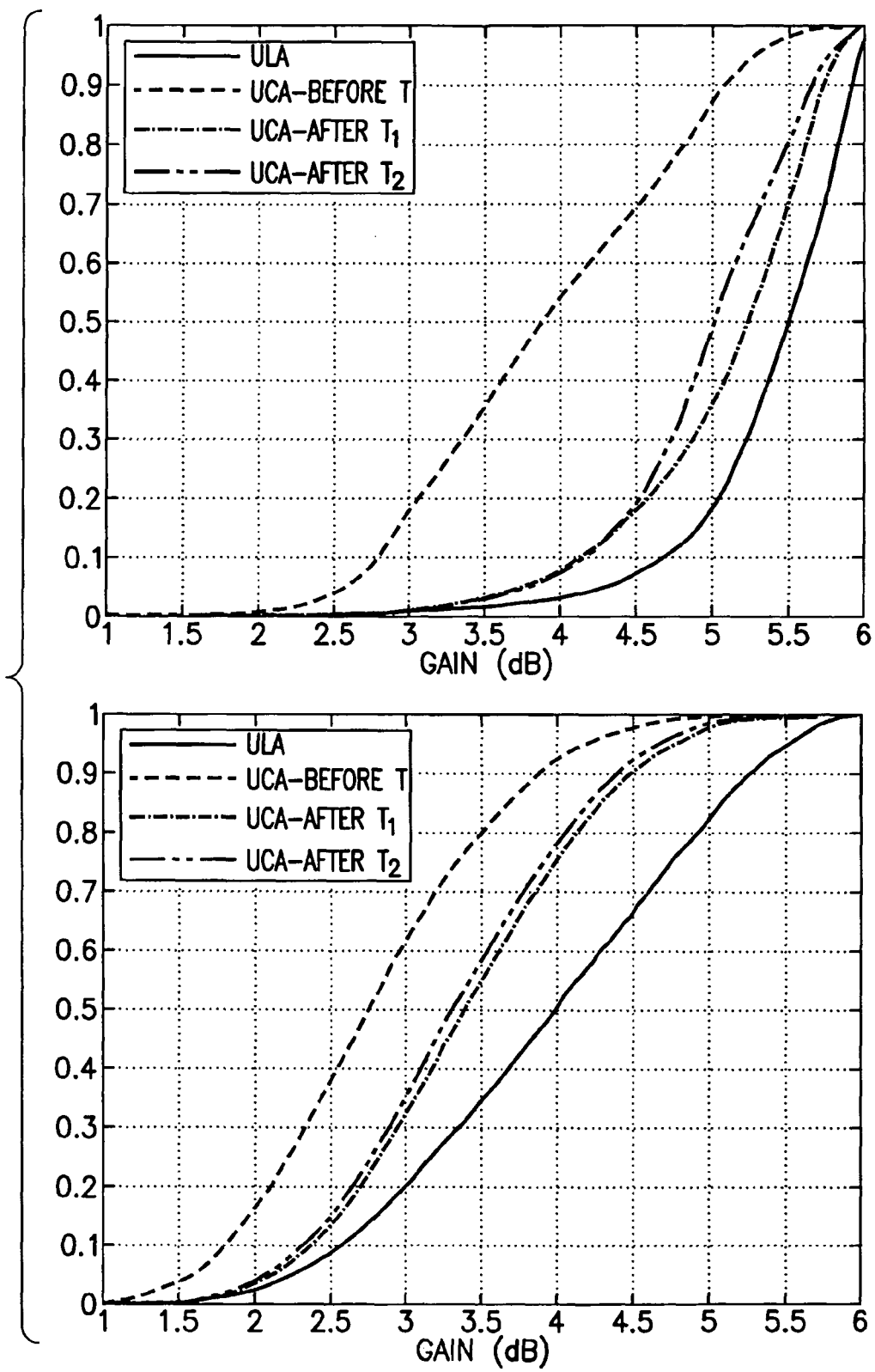
FIG. 8 illustrates a CDF of wideband CB gain for LOS UMi channel (left) and non-LOS UMi channel (right) for all vertically polarized antennas.

FIG. 8 shows CDFs of the wideband CB feedback gain (rank 1) over a single transmit antenna (6.0 dB is the maximum gain) when the ULA and the UCA all have vertically polarized antennas. The application of either unitary matrix to the UCA obtains about a 1.2 dB gain on average in the LOS channel and 0.6 dB gain in the non-LOS channel. Also note that the lower tail of the CDF (corresponding to the lowest gains) is significantly improved when using either unitary matrix. For rank 2 transmissions (results not shown), the gain of using either unitary matrix with the UCA was also around 1.1 dB in the LOS channel. For co-polarized elements, $T_1$ appears to have slightly better performance than $T_2$.

Figure 9:
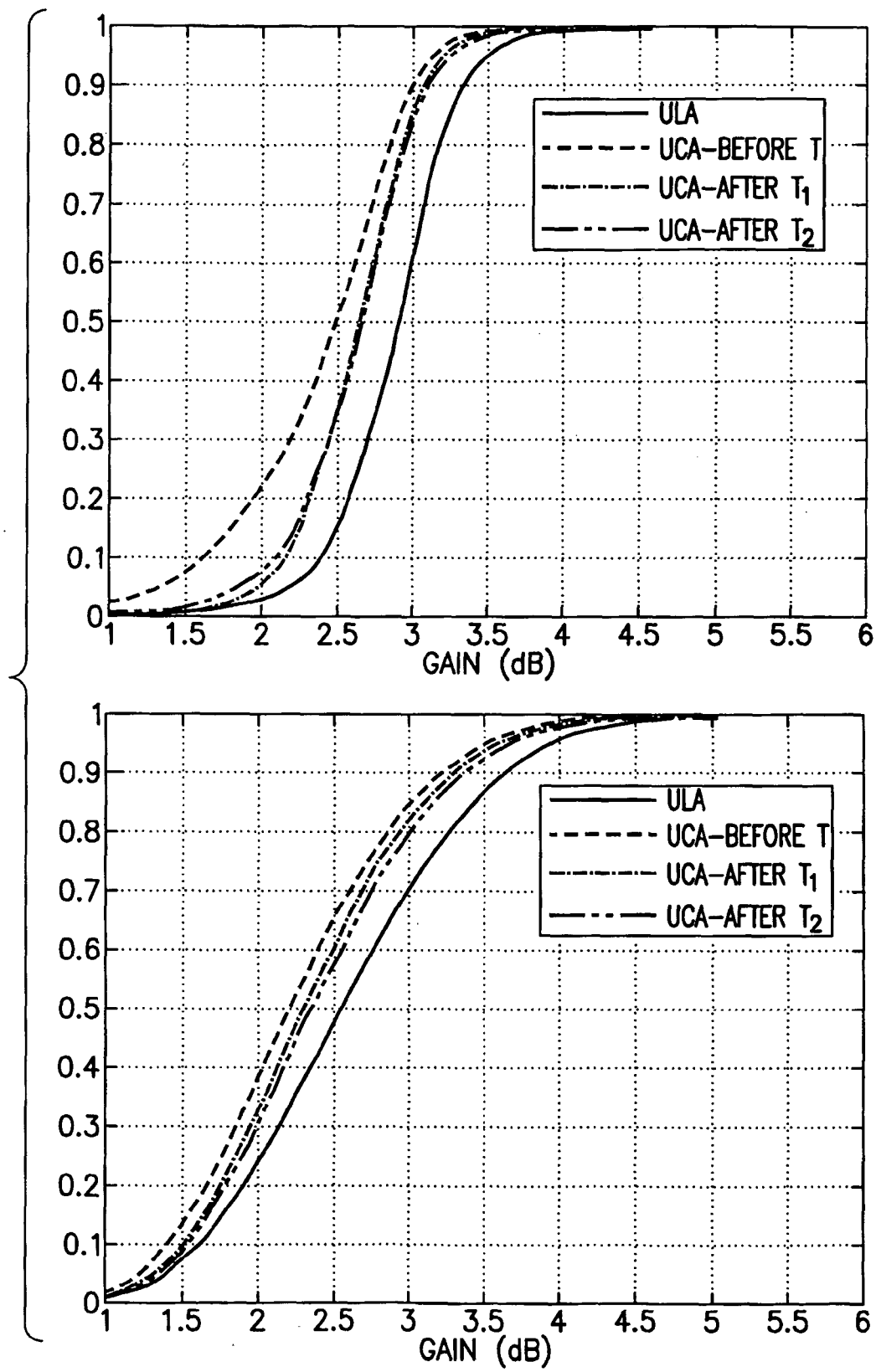
FIG. 9 illustrates a CDF of wideband CB gain for LOS UMi channel (left) and non-LOS UMi channel (right) for mix of vertically and horizontally polarized antennas.

FIG. 9 shows CDFs of the wideband CB feedback gain (rank 1) when the ULA and UCA have alternating vertically polarized and horizontally polarized antennas. In all cases (even the ULA) the gain is significantly reduced over having all vertically polarized antennas (mostly due to the channels not being dominated by a single dimension). However the application of either unitary matrix for the UCA still obtains a small mean gain of around 0.2 dB for the LOS channel (note that the gain is higher at the lower tail of the CDF) and around 0.1 dB for the non-LOS channel. For rank 2 transmissions (results not shown), the gain of using either unitary matrix with the UCA was around 0.25 dB in the LOS channel. For cross-polarized antennas, $T_2$ appears to have slightly better performance than $T_1$.

It is clear from FIG. 9 that the unitary matrices that are optimized for co-polarized antennas only provides marginal gains for the case where the UCA had mixed polarizations. Hence another design option is used for designing T in the case of mixed polarizations. One option for designing T can be found by observing that the dyadic term (the dyadic term gives a mathematical description of how the polarization changes for a given channel ray) for a single channel ray from one eNodeB antenna to one UE antenna is given by:

$$\begin{bmatrix} \cos(\psi_b) \\ \sin(\psi_b) \end{bmatrix}^T \begin{bmatrix} e^{j\phi_{VV}} & \gamma_{VH}e^{j\phi_{VH}} \\ \gamma_{HV}e^{j\phi_{HV}} & e^{j\phi_{HH}} \end{bmatrix} \begin{bmatrix} \cos(\psi_m) \\ \sin(\psi_m) \end{bmatrix}, \quad (18)$$

where $\psi_b$ is the polarization angle of the eNodeB antenna, $\psi_m$ is the polarization angle of the UE antenna, $\phi_{VV}$, $\phi_{HH}$, $\phi_{VH}$, $\phi_{HV}$ are the phases of the individual polarization components of the channel ray, and $\gamma_{VH}$ and $\gamma_{HV}$ are gain values for the given cross-polarization discrimination factor of the ray. For a LOS ray, Eq. (18) becomes:

$$\begin{bmatrix} \cos(\psi_b) \\ \sin(\psi_b) \end{bmatrix}^T \begin{bmatrix} 1 & 0 \\ 0 & 1 \end{bmatrix} \begin{bmatrix} \cos(\psi_m) \\ \sin(\psi_m) \end{bmatrix}. \quad (19)$$

Thus for a vertically polarized antenna at the eNodeB ($\psi_b=0$) and a horizontally polarized antenna at the eNodeB ($\psi_b=90$), Eq. (19) becomes (respectively):

$$\begin{bmatrix} 1 \\ 0 \end{bmatrix}^T \begin{bmatrix} 1 & 0 \\ 0 & 1 \end{bmatrix} \begin{bmatrix} \cos(\psi_m) \\ \sin(\psi_m) \end{bmatrix} = \cos(\psi_m) \text{ and} \quad (20)$$

$$\begin{bmatrix} 1 \\ 0 \end{bmatrix}^T \begin{bmatrix} 1 & 0 \\ 0 & 1 \end{bmatrix} \begin{bmatrix} \cos(\psi_m) \\ \sin(\psi_m) \end{bmatrix} = \sin(\psi_m). \quad (21)$$

Thus to design a unitary matrix for alternating polarizations (vertical and horizontal) in a UCA, instead of using the array manifold in Eq. (2), the following array manifold could be used (assuming M is even):

$$M \times 1 \ a(\theta, \phi) = \begin{bmatrix} \cos(\psi_m)e^{j2\pi r \sin(\phi)\cos(\theta)} \\ \sin(\psi_m)e^{j2\pi r \sin(\phi)\cos(\theta-2\pi/M)} \\ \vdots \\ \cos(\psi_m)e^{j2\pi r \sin(\phi)\cos(\theta-2\pi(M-2)/M)} \\ \sin(\psi_m)e^{j2\pi r \sin(\phi)\cos(\theta-2\pi(M-1)/M)} \end{bmatrix}, \quad (22)$$

where multiple $\psi_m$'s are chosen (e.g., randomly or with a uniform sampling). Using this idea a good unitary matrix for alternating polarizations when using the four Tx LTE CB is given as:

$$T_3 = \sqrt{0.5} \begin{bmatrix} e^{j1.532} & 0 & 0 & e^{-j0.851} \\ 0 & 1 & e^{j0.828} & 0 \\ e^{-j1.606} & 0 & 0 & e^{-j0.848} \\ 0 & 1 & e^{-j2.329} & 0 \end{bmatrix}. \quad (23)$$

When $T_3$ is used with the LTE CB, note that some of the new effective codebook vectors will have unequal power across antennas. So when using $T_3$ in practice care should be taken so that the time-domain signals going to the antennas are roughly equal unless the hardware can handle the situation (e.g., by increasing the backoff to the power amplifiers). The power across the antennas can be made roughly equal by, for example, scheduling (across frequency) users which select complimentary CB vectors (i.e., if one antenna power is low in one CB vector it is high in the other CB vector).

Figure 10:
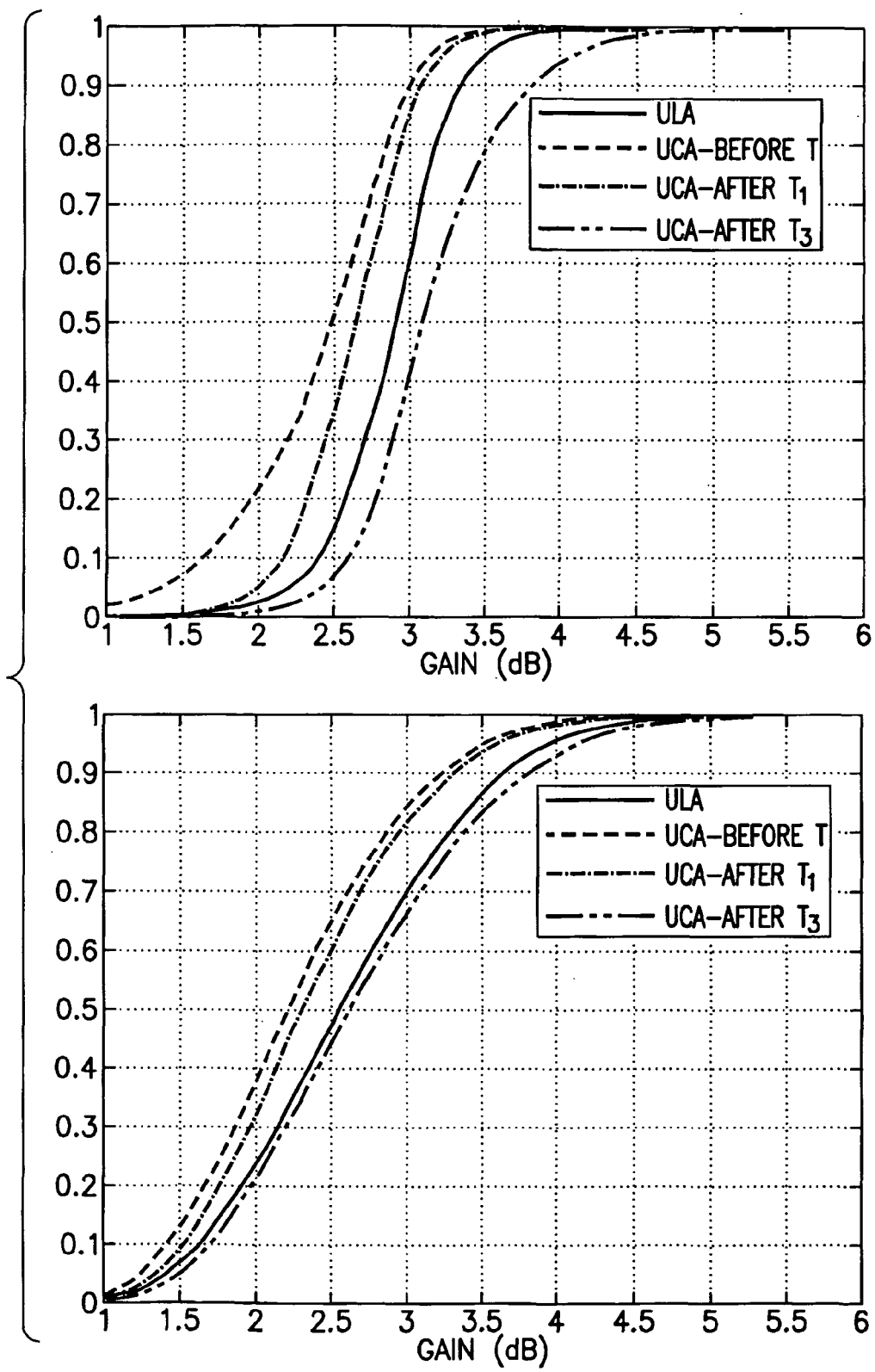
FIG. 10 illustrates a CDF of wideband CB gain for LOS UMi channel (left) and non-LOS UMi channel (right) for mix of vertically and horizontally polarized antennas using $T_3$ which is specifically designed for a UCA with mixed polarizations in accordance with various exemplary embodiments of this invention.

FIG. 10 shows rank one results when using the unitary matrix designed for the alternating polarizations ($T_3$). As can be seen the performance is greatly improved over using $T_1$ which was designed for co-polarized antennas. Using $T_3$ there is around a 0.8 dB average gain in the LOS case and a 0.45 dB average gain in the non-LOS case over not using a unitary matrix.

Various exemplary embodiments in accordance with this invention describe methods for improving the performance of arbitrary array geometries when using a codebook designed for a different array geometry such as the codebook defined in R8 and R10 LTE. The use of the unitary matrix is transparent to the UE and hence no change to the standard is needed. Gains of up to 1.1 dB were seen when using one of the designed unitary matrices with a four antenna uniform circular array and R8 codebook feedback in a line of sight UMi channel.

Various exemplary embodiments in accordance with this invention apply a unitary matrix across all antennas for all transmissions from the eNodeB when the eNodeB is using a non-linear array (e.g., a uniform circular array). The unitary matrix is designed to improve the performance of a codebook designed for a linear array (e.g., the LTE codebooks). The unitary matrix may be applied for all transmissions from the eNodeB and hence is transparent to the UEs and thus does not require any change to the LTE standard for its use. Since a unitary transform is used there is no performance impact to broadcast channels but a significant improvement is seen with the codebook-based beamformed transmissions. A pre-computed unitary matrix can be used based on the expected performance of an array or can computed and adapted based on uplink signals.

Various exemplary embodiments in accordance with this invention provide a method for feeding forward a unitary matrix (or feeding back a unitary matrix) where the unitary matrix is designed to improve the performance of a codebook designed for a linear array (e.g., the LTE codebooks). In the feed-forward case the eNodeB computes or selects the unitary matrix and in the feed-back case the UE computes or selects the unitary matrix. The UE may determine the best codebook to use based on the multiplication of this unitary matrix with the existing codebook. When the eNodeB transmits, the eNodeB would use transmit weights which are the codebook entry selected by the UE (from the existing codebook) multiplied by the unitary matrix. Since the unitary matrix design depends on the array and hardware characteristics, it would change relatively infrequently (e.g., over minutes or hours) and hence would be fed back or fed forward very infrequently.

Based on the foregoing it should be apparent that the exemplary embodiments of this invention provide a method, apparatus and computer program(s) to improve codebook performance for non-linear arrays.

Figure 11:
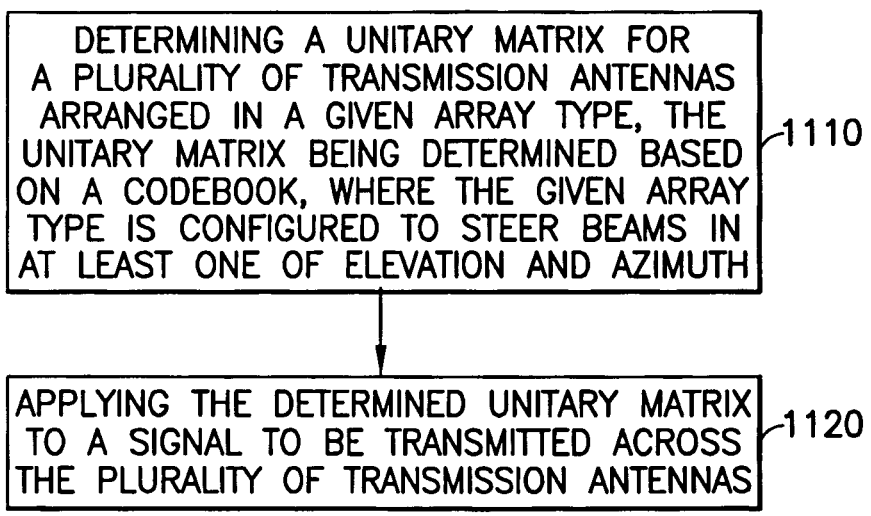
FIG. 11 is a logic flow diagram that illustrates the operation of an exemplary method, and a result of execution of computer program instructions embodied on a computer readable memory, in accordance with various exemplary embodiments of this invention.

FIG. 11 is a logic flow diagram that illustrates the operation of a method, and a result of execution of computer program instructions, in accordance with the exemplary embodiments of this invention. In accordance with these exemplary embodiments a method performs, at Block 1110, a step of determining a unitary matrix for a plurality of transmission antennas arranged in a given array type, the unitary matrix being determined based on a codebook, where the given array type is configured to steer beams in at least one of elevation and azimuth. The method also performs, at Block 1120, a step of applying the determined unitary matrix to a signal to be transmitted across the plurality of transmission antennas.

The various blocks shown in FIG. 11 may be viewed as method steps, and/or as operations that result from operation of computer program code, and/or as a plurality of coupled logic circuit elements constructed to carry out the associated function(s).

An exemplary embodiment in accordance with this invention is a method to improve codebook performance for non-linear arrays. The method includes determining (e.g., by a processor) a unitary matrix for a plurality of transmission antennas arranged in a given array type, the unitary matrix being determined based on a codebook, where the given array type is configured to steer beams in at least one of elevation and azimuth. The method also includes applying (e.g., by a processor) the determined unitary matrix to a signal to be transmitted across the plurality of transmission antennas.

In a further exemplary embodiment of the method above, the plurality of transmission antennas is manifold calibrated.

In an additional exemplary embodiment of any one of the methods above, the unitary matrix is determined such that the power on transmit branches is approximately equal for codebook transmissions.

In a further exemplary embodiment of any one of the methods above, determining the unitary matrix includes obtaining (e.g., by a processor and/or a memory) a pre-computed unitary matrix from a table look up.

In an additional exemplary embodiment of any one of the methods above, the codebook is a rank 1 codebook or a multi-rank codebook.

In a further exemplary embodiment of any one of the methods above, the codebook is a uniform linear array codebook.

In an additional exemplary embodiment of any one of the methods above, the given array type is a uniform circular array.

In a further exemplary embodiment of any one of the methods above, determining the unitary matrix includes performing a gradient search (e.g., by a processor).

In an additional exemplary embodiment of any one of the methods above, the determined unitary matrix is a sparse matrix where each row only has one non-zero entry.

In a further exemplary embodiment of any one of the methods above, the determined unitary matrix maximizes mean gain or minimum gain.

In an additional exemplary embodiment of any one of the methods above, the determined unitary matrix, T, maximizes $$\sum_{\theta \in \Omega} \max_m |f_m^T Ta(\theta)|^2,$$

where $\Omega$ is a set of angles of interest, $a(\theta)$ is an array of manifold vectors and f is a vector from the codebook.

In a further exemplary embodiment of any one of the methods above, the determined unitary matrix, T, minimizes $$\sum_{u=1}^{N_u} \min_m |f_m^T T e_u|^2,$$

where $N_u$ is the number of total users, $e_u$ is a dominate eigenvector, f is a vector from the codebook such that $x(t)=f_i s(t)$ where s(t) is the transmitted symbol at time t and x(t) is an original M×1 transmit signal on all antennas at time t.

In an additional exemplary embodiment of any one of the methods above, the determined unitary matrix, T, minimizes $$\sum_{\theta \in \Omega} |T a_{UCA}(\theta, 90) - a_{ULA}(\theta)|^2,$$

where $\Omega$ is a set of angles of interest, $a_{UCA}(\theta)$ is an array of manifold vectors for a unitary circular array and $a_{ULA}(\theta)$ is an array of manifold vectors for a unitary linear array.

In a further exemplary embodiment of any one of the methods above, the given array type is a first array type of a plurality of array types and the codebook is a codebook designed (e.g., optimized) for a second, different array type of the plurality of array types.

In an additional exemplary embodiment of any one of the methods above, the codebook is designed (e.g., optimized) for no specific array type.

A further exemplary embodiment in accordance with this invention is an apparatus to improve codebook performance for non-linear arrays. The apparatus includes one or more processors; and one or more memories storing computer program code. The one or more memories and the computer program code configured to, with the one or more processors, cause the apparatus to perform at least the following: to determine a unitary matrix for a plurality of transmission antennas arranged in a given array type, the unitary matrix being determined based on a codebook, where the given array type is configured to steer beams in elevation and/or azimuth; and to apply the determined unitary matrix to a signal to be transmitted across the plurality of transmission antennas.

In an additional exemplary embodiment of the apparatus above, the plurality of transmission antennas is manifold calibrated.

In a further exemplary embodiment of any one of the apparatus above, the unitary matrix is determined such that the power on transmit branches is approximately equal for codebook transmissions.

In an additional exemplary embodiment of any one of the apparatus above, when determining the unitary matrix, the one or more memories and the computer program code are further configured to cause the apparatus to obtain a pre-computed unitary matrix from a table look up.

In a further exemplary embodiment of any one of the apparatus above, the codebook is a rank 1 codebook or a multi-rank codebook.

In an additional exemplary embodiment of any one of the apparatus above, the codebook is a uniform linear array codebook.

In a further exemplary embodiment of any one of the apparatus above, the given array type is a uniform circular array.

In an additional exemplary embodiment of any one of the apparatus above, when determining the unitary matrix, the one or more memories and the computer program code are further configured to cause the apparatus to perform a gradient search.

In a further exemplary embodiment of any one of the apparatus above, the determined unitary matrix is a sparse matrix where each row only has one non-zero entry.

In an additional exemplary embodiment of any one of the apparatus above, the determined unitary matrix maximizes mean gain or minimum gain.

In a further exemplary embodiment of any one of the apparatus above, where the determined unitary matrix, T, maximizes $$\sum_{\theta \in \Omega} \max_m |f_m^T T a(\theta)|^2,$$

where $\Omega$ is a set of angles of interest, $a(\theta)$ is an array of manifold vectors and f is a vector from the codebook.

In an additional exemplary embodiment of any one of the apparatus above, the determined unitary matrix, T, minimizes $$\sum_{u=1}^{N_u} \min_m |f_m^T T e_u|^2,$$

where $N_u$ is the number of total users, $e_u$ is a dominate eigenvector, f is a vector from the codebook such that $x(t)=f_i s(t)$ where s(t) is the transmitted symbol at time t and x(t) is an original M×1 transmit signal on all antennas at time t.

In a further exemplary embodiment of any one of the apparatus above, the determined unitary matrix, T, minimizes $$\sum_{\theta \in \Omega} |T a_{UCA}(\theta, 90) - a_{ULA}(\theta)|^2,$$

where $\Omega$ is a set of angles of interest, $a_{UCA}(\theta)$ is an array of manifold vectors for a unitary circular array and $a_{ULA}(\theta)$ is an array of manifold vectors for a unitary linear array.

In an additional exemplary embodiment of any one of the apparatus above, the given array type is a first array type of a plurality of array types and the codebook is a codebook designed (e.g., optimized) for a second, different array type of the plurality of array types.

In a further exemplary embodiment of any one of the apparatus above, the codebook is designed (e.g., optimized) for no specific array type.

An additional exemplary embodiment in accordance with this invention is a computer readable medium to improve codebook performance for non-linear arrays. The computer readable medium is tangibly encoded with a computer program executable by a processor to perform actions. The actions include determining a unitary matrix for a plurality of transmission antennas arranged in a given array type, the unitary matrix being determined based on a codebook, where the given array type is configured to steer beams in elevation and/or azimuth; and applying the determined unitary matrix to a signal to be transmitted across the plurality of transmission antennas.

In a further exemplary embodiment of any one of the computer readable medium above, the plurality of transmission antennas is manifold calibrated.

In an additional exemplary embodiment of any one of the computer readable media above, the unitary matrix is determined such that the power on transmit branches is approximately equal for codebook transmissions.

In a further exemplary embodiment of any one of the computer readable media above, determining the unitary matrix includes obtaining a pre-computed unitary matrix from a table look up.

In an additional exemplary embodiment of any one of the computer readable media above, the codebook is a rank 1 codebook or a multi-rank codebook.

In a further exemplary embodiment of any one of the computer readable media above, the codebook is a uniform linear array codebook.

In an additional exemplary embodiment of any one of the computer readable media above, the given array type is a uniform circular array.

In a further exemplary embodiment of any one of the computer readable media above, determining the unitary matrix includes a gradient search.

In an additional exemplary embodiment of any one of the computer readable media above, the determined unitary matrix is a sparse matrix where each row only has one non-zero entry.

In a further exemplary embodiment of any one of the computer readable media above, the determined unitary matrix maximizes mean gain or minimum gain.

In an additional exemplary embodiment of any one of the computer readable media above, the determined unitary matrix, T, maximizes $$\sum_{\theta \in \Omega} \max_m |f_m^T T a(\theta)|^2,$$

where $\Omega$ is a set of angles of interest, $a(\theta)$ is an array of manifold vectors and f is a vector from the codebook.

In a further exemplary embodiment of any one of the computer readable media above, the determined unitary matrix, T, minimizes $$\sum_{u=1}^{N_u} \min_m |f_m^T T e_u|^2,$$

where $N_u$ is the number of total users, $e_u$ is a dominate eigenvector, f is a vector from the codebook such that $x(t)=f_s s(t)$ where $s(t)$ is the transmitted symbol at time t and $x(t)$ is an original M×1 transmit signal on all antennas at time t.

In an additional exemplary embodiment of any one of the computer readable media above, the determined unitary matrix, T, minimizes $$\sum_{\theta \in \Omega} |T a_{UCA}(\theta, 90) - a_{ULA}(\theta)|^2,$$

where $\Omega$ is a set of angles of interest, $a_{UCA}(\theta)$ is an array of manifold vectors for a unitary circular array and $a_{ULA}(\theta)$ is an array of manifold vectors for a unitary linear array.

In a further exemplary embodiment of any one of the computer readable media above, the computer readable medium is a non-transitory computer readable medium (e.g., RAM, CD-ROM, flash memory, etc.).

In a further exemplary embodiment of any one of the computer readable media above, the given array type is a first array type of a plurality of array types and the codebook is a codebook designed (e.g., optimized) for a second, different array type of the plurality of array types.

In an additional exemplary embodiment of any one of the computer readable media above, the codebook is designed (e.g., optimized) for no specific array type.

An additional exemplary embodiment in accordance with this invention is an apparatus to improve codebook performance for non-linear arrays. The apparatus includes means for determining (e.g., a processor) a unitary matrix for a plurality of transmission antennas arranged in a given array type, the unitary matrix being determined based on a codebook, where the given array type is configured to steer beams in elevation and/or azimuth; and means for applying (e.g., a processor) the determined unitary matrix to a signal to be transmitted across the plurality of transmission antennas.

In a further exemplary embodiment of the apparatus above, the plurality of transmission antennas is manifold calibrated.

In an additional exemplary embodiment of any one of the apparatus above, the unitary matrix is determined such that the power on transmit branches is approximately equal for codebook transmissions.

In a further exemplary embodiment of any one of the apparatus above, the determining means comprises means for obtaining (e.g., a processor and/or a memory) a pre-computed unitary matrix from a table look up.

In an additional exemplary embodiment of any one of the apparatus above, the codebook is a rank 1 codebook or a multi-rank codebook.

In a further exemplary embodiment of any one of the apparatus above, the codebook is a uniform linear array codebook.

In an additional exemplary embodiment of any one of the apparatus above, the given array type is a uniform circular array.

In a further exemplary embodiment of any one of the apparatus above, the determining means comprises means for performing a gradient search (e.g., a processor).

In an additional exemplary embodiment of any one of the apparatus above, the determined unitary matrix is a sparse matrix where each row only has one non-zero entry.

In a further exemplary embodiment of any one of the apparatus above, the determined unitary matrix maximizes mean gain or minimum gain.

In an additional exemplary embodiment of any one of the apparatus above, the determined unitary matrix, T, maximizes $$\sum_{\theta \in \Omega} \max_m |f_m^T T a(\theta)|^2,$$

where $\Omega$ is a set of angles of interest, $a(\theta)$ is an array of manifold vectors and f is a vector from the codebook.

In a further exemplary embodiment of any one of the apparatus above, the determined unitary matrix, T, minimizes $$\sum_{u=1}^{N_u} \min_m |f_m^T T e_u|^2,$$

where $N_u$ is the number of total users, $e_u$ is a dominate eigenvector, f is a vector from the codebook such that $x(t)=f_s s(t)$ where s(t) is the transmitted symbol at time t and x(t) is an original M×1 transmit signal on all antennas at time t.

In an additional exemplary embodiment of any one of the apparatus above, the determined unitary matrix, T, minimizes $$\sum_{\theta\in\Omega}|Ta_{UCA}(\theta,90)-a_{ULA}(\theta)|^2,$$

where $\Omega$ is a set of angles of interest, $a_{UCA}(\theta)$ is an array of manifold vectors for a unitary circular array and $a_{ULA}(\theta)$ is an array of manifold vectors for a unitary linear array.

In a further exemplary embodiment of any one of the apparatus above, the given array type is a first array type of a plurality of array types and the codebook is a codebook designed (e.g., optimized) for a second, different array type of the plurality of array types.

In an additional exemplary embodiment of any one of the apparatus above, the codebook is designed (e.g., optimized) for no specific array type.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example UTRAN.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   determining, by a communication device, a unitary matrix for a plurality of transmission antennas arranged in a given array type, the unitary matrix being determined based on a plurality of entries of a codebook of the communication device and the given array type, where the given array type is configured to steer beams in at least one of elevation and azimuth;
   applying, by the communication device, the determined unitary matrix to a signal precoded with a precoding vector from the codebook; and
   transmitting, by the communication device, the signal across the plurality of transmission antennas.

2. The method of claim 1, where the unitary matrix is also applied to a common reference symbol for the signal.

3. The method of claim 1, wherein the unitary matrix is determined such that the power on transmit branches is approximately equal for codebook transmissions.

4. The method of claim 1, wherein determining the unitary matrix comprises obtaining a pre-computed unitary matrix from a table look up.

5. The method of claim 1, wherein the codebook is one of a rank 1 codebook and a multi-rank codebook.

6. The method of claim 1, wherein the codebook is a uniform linear array codebook.

7. The method of claim 1, wherein the given array type is a uniform circular array.

8. The method of claim 1, where determining the unitary matrix comprises performing a gradient search.

9. The method of claim 1, where the determined unitary matrix is a sparse matrix where each row only has one non-zero entry.

10. The method of claim 1, where the determined unitary matrix maximizes one of: mean gain and minimum gain.

11. The method of claim 1, where the determined unitary matrix, T, maximizes $$\sum_{\theta\in\Omega}\max_m |f_m^T Ta(\theta)|^2,$$

where $\Omega$ is a set of angles of interest,
a($\theta$) is an array of manifold vectors, and
f is a vector from the codebook.

12. The method of claim 1, where the determined unitary matrix, T, minimizes $$\sum_{u=1}^{N_u} \min_m |f_m^T T e_u|^2,$$

where $N_u$ is the number of total users,
$e_u$ is a dominate eigenvector,
f is a vector from the codebook such that $x(t)=f_t s(t)$ where s(t) is the transmitted symbol at time t, and
x(t) is an original M×1 transmit signal on all antennas at time t.

13. The method of claim 1, where the determined unitary matrix, T, minimizes $$\sum_{\theta \in \Omega} |Ta_{UCA}(\theta, 90) - a_{ULA}(\theta)|^2,$$

where $\Omega$ is a set of angles of interest,
$a_{UCA}(\theta)$ is an array of manifold vectors for a unitary circular array, and
$a_{ULA}(\theta)$ is an array of manifold vectors for a unitary linear array.

14. An apparatus, comprising at least one processor; and at least one memory including computer program code, the at least one memory and the computer program code configured to, with the at least one processor, cause the apparatus to perform at least the following:
to determine a unitary matrix for a plurality of transmission antennas arranged in a given array type, the unitary matrix being determined based on a plurality of entries of a codebook of the apparatus and the given array type, where the given array type is configured to steer beams in at least one of elevation and azimuth;
to apply the determined unitary matrix to a signal precoded with a precoding vector from the codebook; and
to transmit the signal across the plurality of transmission antennas.

15. The apparatus of claim 14, wherein the unitary matrix is determined such that the power on transmit branches is approximately equal for codebook transmissions.

16. The apparatus of claim 14, where, when determining the unitary matrix, the at least one memory and the computer program code are further configured to cause the apparatus to obtain a pre-computed unitary matrix from a table look up.

17. A non-transitory computer readable medium tangibly encoded with a computer program executable by a processor to perform actions comprising:
determining a unitary matrix for a plurality of transmission antennas arranged in a given array type, the unitary matrix being determined based on a plurality of entries of a codebook and the given array type, where the given array type is configured to steer beams in at least one of elevation and azimuth;
applying the determined unitary matrix to a signal precoded with a precoding vector from the codebook; and
transmitting the signal across the plurality of transmission antennas.

18. The computer readable medium of claim 17, wherein the unitary matrix is determined such that the power on transmit branches is approximately equal for codebook transmissions.

19. An apparatus, comprising:
means for determining a unitary matrix for a plurality of transmission antennas arranged in a given array type, the unitary matrix being determined based on a plurality of entries of a codebook of the apparatus and the given array type, where the given array type is configured to steer beams in at least one of elevation and azimuth;
means for applying the determined unitary matrix to a signal precoded with a precoding vector from the codebook; and
means for transmitting the signal across the plurality of transmission antennas.

20. The apparatus of claim 19, wherein the unitary matrix is determined such that the power on transmit branches is approximately equal for codebook transmissions.

* * * * *